US006644206B2

United States Patent
Fogle, Jr.

(10) Patent No.: US 6,644,206 B2
(45) Date of Patent: Nov. 11, 2003

(54) ELECTRICALLY ACTUATABLE INITIATOR WITH OUTPUT CHARGE

(75) Inventor: Homer W. Fogle, Jr., Mesa, AZ (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 10/036,905

(22) Filed: Dec. 21, 2001

(65) Prior Publication Data

US 2003/0116052 A1 Jun. 26, 2003

(51) Int. Cl.[7] ................................................. C06D 5/20
(52) U.S. Cl. ........................ 102/530; 102/531; 280/741
(58) Field of Search ................................ 102/530, 531, 102/202.11, 202.12, 202.14, 200; 280/735, 736, 741

(56) References Cited

U.S. PATENT DOCUMENTS

| | | | | |
|---|---|---|---|---|
| 3,249,047 A | * | 5/1966 | Gill et al. ............... | 102/202.14 |
| 4,902,036 A | | 2/1990 | Zander et al. | |
| 5,046,429 A | | 9/1991 | Swann et al. | |
| 5,140,906 A | * | 8/1992 | Little, II ................ | 102/202.14 |
| 5,142,982 A | * | 9/1992 | Diepold et al. ......... | 102/202.14 |
| 5,433,147 A | * | 7/1995 | Brede et al. ............ | 102/530 |
| 5,556,130 A | * | 9/1996 | Fulmer .................. | 102/530 |
| 5,558,366 A | * | 9/1996 | Fogle et al. ............ | 102/530 |
| 5,621,183 A | * | 4/1997 | Bailey ................... | 102/202.14 |
| 5,821,446 A | * | 10/1998 | Chatley, Jr. ............ | 102/202.14 |
| 5,829,785 A | * | 11/1998 | Jordan et al. ............ | 102/530 |
| 5,939,660 A | | 8/1999 | Fogle, Jr. | |
| 6,227,565 B1 | | 5/2001 | McFarland et al. | |
| 6,289,813 B1 | * | 9/2001 | Duguet et al. ......... | 102/202.14 |
| 6,295,935 B1 | * | 10/2001 | Swann et al. .......... | 102/202.14 |
| 6,338,500 B1 | * | 1/2002 | Perotto .................. | 102/530 |
| 6,341,562 B1 | * | 1/2002 | Brisighella ............. | 102/202.14 |
| 6,368,431 B1 | * | 4/2002 | Mangum et al. ........ | 102/530 |
| 6,408,758 B1 | * | 6/2002 | Duguet .................. | 102/202.14 |
| 6,435,550 B1 | * | 8/2002 | Werneth et al. ........ | 102/202.14 |

* cited by examiner

Primary Examiner—Michael J. Carone
Assistant Examiner—Lulit Semunegus
(74) Attorney, Agent, or Firm—Tarolli, Sundheim, Covell & Tummino L.L.P.

(57) ABSTRACT

An apparatus (10) comprises a first assembly (60) and a second assembly (62). The first assembly comprises a base (70) and an electrically energizable mechanism (108, 110), and has a first mounting portion (86). The second assembly (62) comprises an ignitable material (121) in a sealed container (120). The container (120) has a first wall portion (144) that is rupturable to enable ignition of the ignitable material (121). The container has a second wall portion (128) that is rupturable in response to ignition of the ignitable material (121) to enable flow of combustion products out of the container (120). The container (120) has a second mounting portion (152). The first mounting portion (86) of the first assembly (60) is in abutting engagement with the second mounting portion (152) of the second assembly (62) thereby to fix the first assembly for movement with the second assembly.

19 Claims, 5 Drawing Sheets

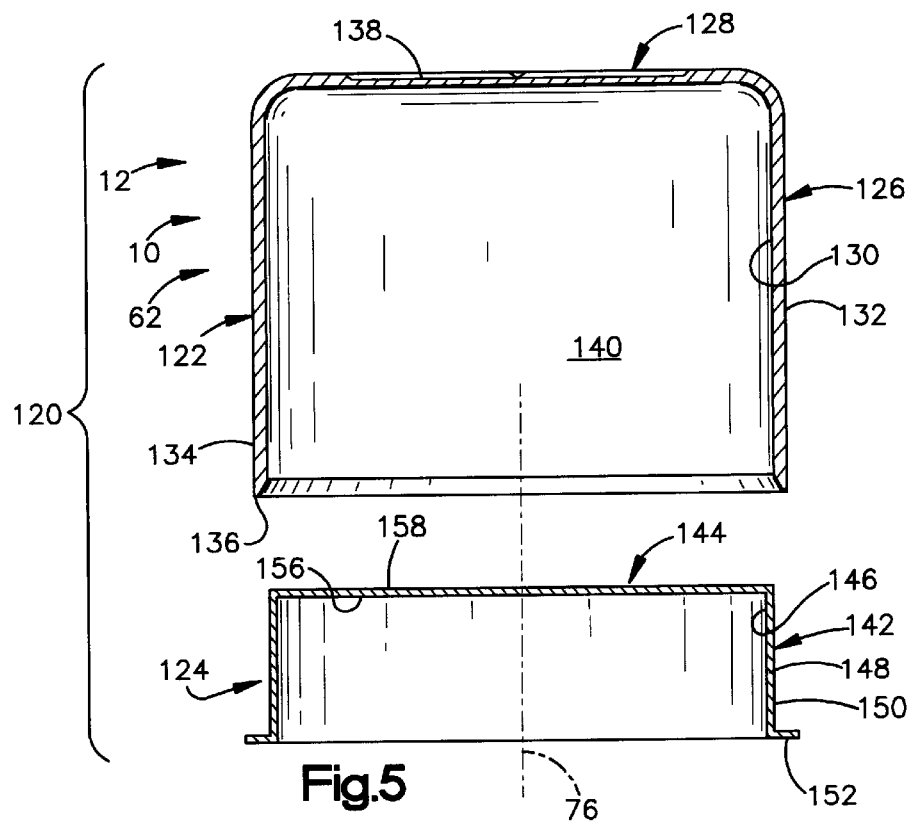
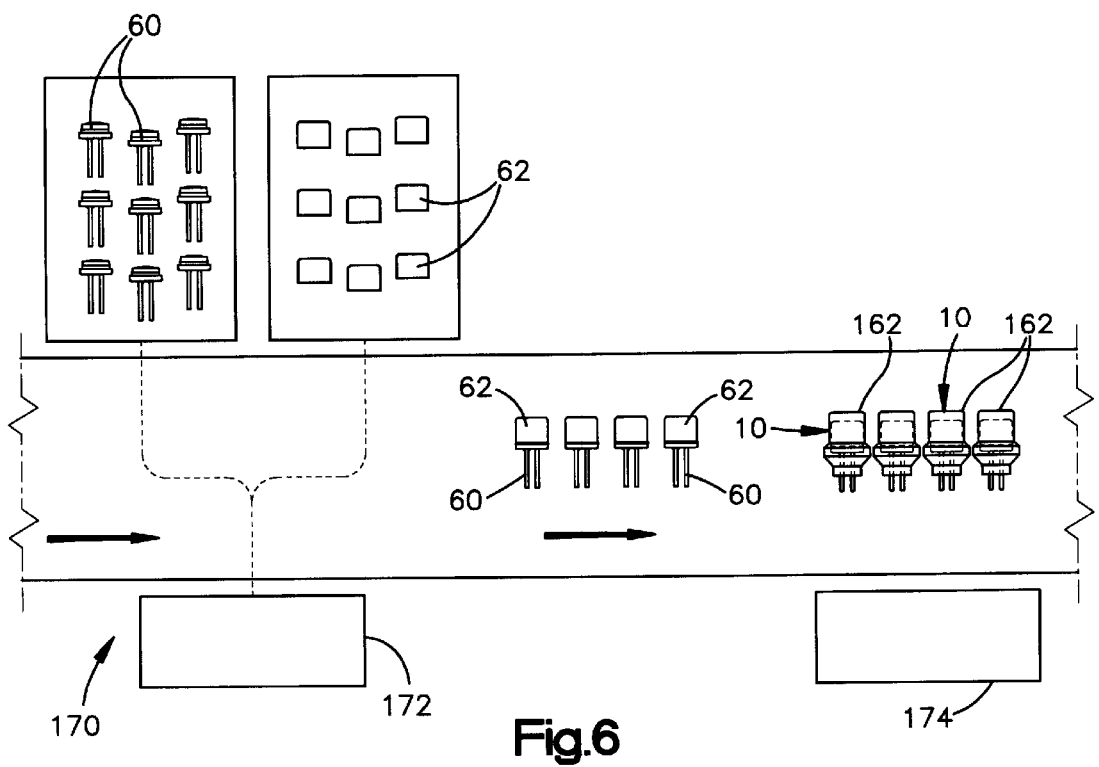

ELECTRICALLY ACTUATABLE INITIATOR WITH OUTPUT CHARGE

BACKGROUND OF THE INVENTION

1. Technical Field

The present invention relates to an electrically energizable device for providing heat energy and other combustion products. In particular, the present invention relates to an initiator for an actuatable vehicle occupant protection device, such as an air bag inflator.

2. Description of Related Art

It is known to use an electrically actuatable device known as an initiator, or squib, in various applications. Such devices are used in munitions, detonators, and inflators for vehicle air bags, side curtains, and the like.

A typical initiator includes two electrodes interconnected by a heating element, such as a bridgewire. When an electric current is passed between the electrodes, the heating element generates heat. The heat is used to ignite an output charge in the initiator, typically a quantity of a pyrotechnic material. U.S. Pat. No. 5,939,660 discloses an initiator of this type.

In a vehicle air bag inflator, the initiator does not, itself, produce the inflation fluid needed to inflate the air bag. Rather, the heat generated by the output charge of the initiator effects actuation of an inflation fluid source. In one type of inflator, the initiator ignites a body of gas generating material or an ignitable fluid. In another type of inflator, such as that shown in U.S. Pat. No. 6,227,565 B1, the heat generated by the output charge of the initiator is used to ignite a separate quantity of ignitable material, known as an ignition enhancer. Combustion of the ignition enhancer then effects actuation of the inflation fluid source.

An initiator for an air bag inflator is a small (typically about one centimeter) device that is usually manufactured separately from the other parts of the inflator. The initiator, because it includes an ignitable material, must be made safe for handling when it is not in its intended final use, that is, before it is assembled into the inflator. Thus, stray electric shocks, or electromagnetic radiation, must not be allowed to affect the ignitable material in the initiator. Also, the ignitable material must be handled carefully and, preferably, kept sealed off as much as possible.

SUMMARY OF THE INVENTION

The present invention is an apparatus comprising a first assembly and a second assembly. The first assembly comprises a base and an electrically energizable mechanism on the base. The first assembly has a first mounting portion. The second assembly comprises a sealed container and an ignitable material in the container. The container has a first wall portion that is rupturable to enable ignition of the ignitable material. The container has a second wall portion that is rupturable in response to ignition of the ignitable material to enable flow of combustion products of the ignitable material out of the container. The container has a second mounting portion. The first mounting portion of the first assembly is in abutting engagement with the second mounting portion of the second assembly thereby to fix the first assembly for movement with the second assembly. The first wall portion of the container ruptures and the ignitable material in the container ignites in response to energizing of the energizable mechanism.

BRIEF DESCRIPTION OF THE DRAWINGS

The foregoing and other features of the present invention will become apparent to those of ordinary skill in the art to which the present invention relates upon reading the following description with reference to the accompanying drawings, in which:

FIG. 5 is an exploded view of a charge container that forms part of the initiator of FIG. 3; and FIG. 6 is a schematic illustration of steps in a process of assembling the initiator of FIG. 3.

DETAILED DESCRIPTION OF THE INVENTION

Figure 1:
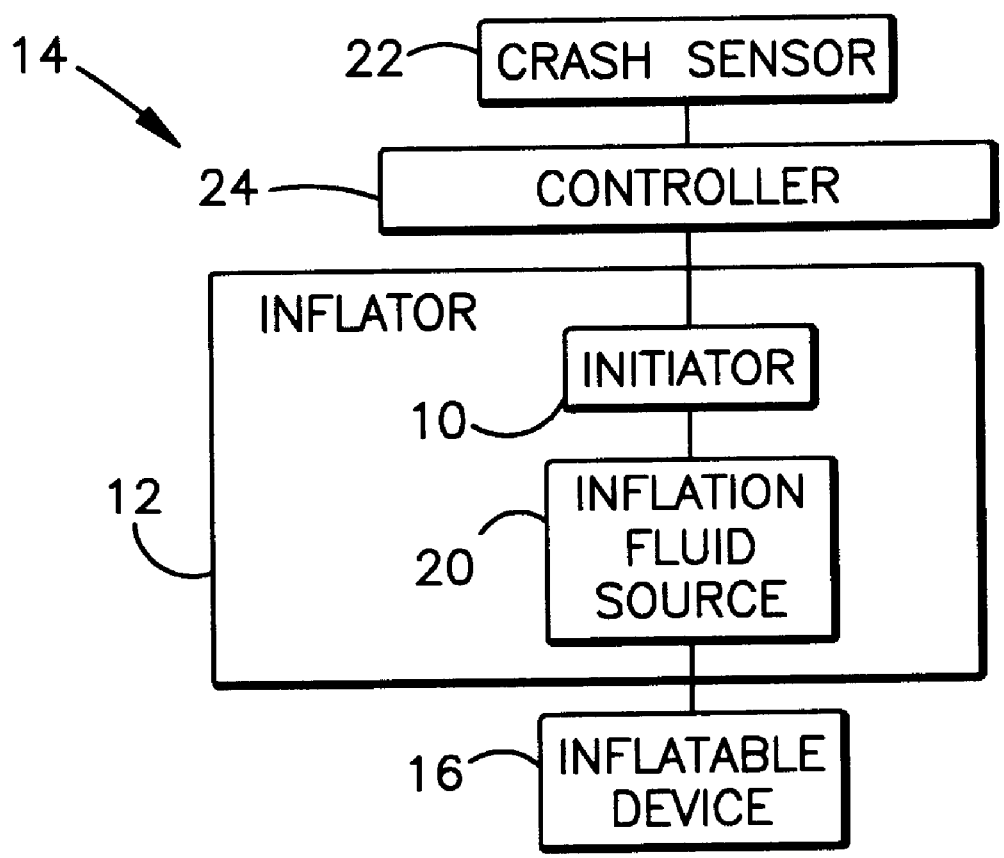
FIG. 1 is a schematic illustration of a vehicle occupant protection system including an inflator having an initiator constructed in accordance with the present invention.

The present invention relates to an electrically energizable device for providing heat energy and other combustion products. In particular, the present invention relates to an initiator for an actuatable vehicle occupant protection device, such as an air bag inflator. As representative of the present invention, FIG. 1 illustrates schematically an initiator 10 for an inflator 12. The inflator 12 forms part of a vehicle occupant protection apparatus 14. The apparatus 14 includes an inflatable vehicle occupant protection device 16. In the preferred embodiment of the invention, the protection device 16 is an air bag. Other inflatable vehicle occupant protection devices that can be used in accordance with the present invention include, for example, inflatable seat belts, inflatable knee bolsters, inflatable head liners, inflatable side curtains, and knee bolsters operated by inflatable air bags.

The inflator 12 is electrically actuatable to provide inflation fluid for inflating the air bag 16. When the air bag 16 is inflated, it extends into a vehicle occupant compartment (not shown) to help protect a vehicle occupant from a forceful impact with parts of the vehicle as a result of a crash.

The inflator 12 (described below in detail) comprises a source of inflation fluid 20 for inflating the air bag 16. In the illustrated embodiment, the inflation fluid source 20 (FIG. 2) is an ignitable gas-generating material that when ignited rapidly generates a large volume of gas. Alternatively, the inflation fluid source 20 may be a stored quantity of pressurized inflation fluid, or a combination of pressurized inflation fluid and ignitable material for heating the inflation fluid.

The apparatus 14 (FIG. 1) also includes a crash sensor 22. The crash sensor 22 is a known device that senses a vehicle condition that indicates the occurrence of a crash. The vehicle condition sensed by the crash sensor 22 preferably is sudden vehicle deceleration that is caused by a collision. The magnitude and duration of the deceleration are measured by the crash sensor 22. If the magnitude and duration of the deceleration indicate the occurrence of a crash for which inflation of the air bag 16 is desired to help protect an occupant of a vehicle, a deployment signal is then transmitted to a controller 24 to indicate the occurrence of such a crash. The controller 24 sends an actuation signal to the initiator 10 of the inflator 12, to actuate the inflator.

The inflator 12 (FIGS. 2–4) is of the type described in U.S. Pat. No. 6,227,565 B1 and includes a generally cylindrical housing or shell 28. The inflator housing 28 has a circular configuration if viewed from above in FIG. 2. The housing 28 includes a first or upper (as viewed in the drawings) housing part 30, referred to herein as a diffuser, and a second or lower (as viewed in the drawings) housing part 40, referred to herein as a closure.

The diffuser 30 has an inverted, cup-shaped configuration including a radially extending end wall 32 and an axially extending side wall 34. The side wall 34 of the diffuser 30 has a cylindrical configuration centered on an axis 36 of the inflator 12. A plurality of inflation fluid outlets 38 are disposed in a circular array on the side wall 34. The outlets 38 enable flow of inflation fluid out of the inflator 12 to inflate the air bag 16. An annular inflator mounting flange 39 extends radially outward from the side wall 34 at a location below (as viewed in FIG. 2) the inflation fluid outlets 38.

Figure 2:
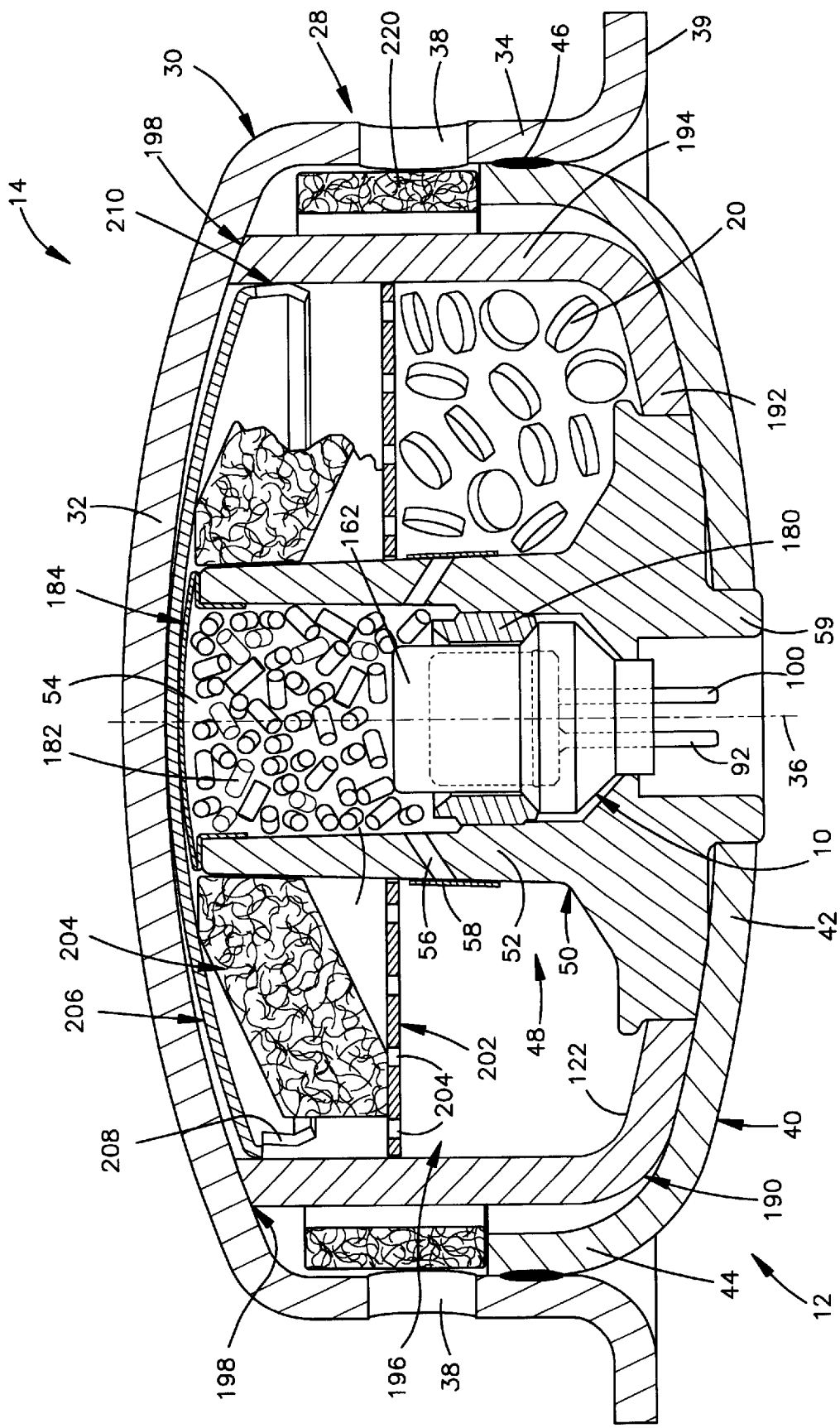
FIG. 2 is a sectional view showing the inflator of FIG. 1 in an unactuated condition.

The closure 40 has a cup-shaped configuration including a radially extending end wall 42 and an axially extending side wall 44. The side wall 44 of the closure 40 has a cylindrical configuration centered on the axis 36. The closure 40 is nested inside the diffuser 30, as seen in FIG. 2. The side wall 44 of the closure 40 is welded to the side wall 34 of the diffuser 30 with a single, continuous weld 46.

The inflator 12 includes an igniter assembly 48. The igniter assembly 48 includes an igniter housing 50 having a side wall 52 that partially defines an ignition chamber 54. A circular array of ports or passages 56 in the side wall 52 extend between the ignition chamber 54 and the exterior of the igniter housing 50. The radially outer ends of the passages 56 are covered by adhesive foil 58. An end portion 59 of the igniter housing 50 extends into a central opening in the end wall 42 of the closure 40.

The igniter assembly 48 also includes the initiator 10. The initiator 10 (FIGS. 3–5) includes a first assembly 60 and a second assembly 62 that are fixedly secured together, in a manner described below, to form the initiator. The initiator 10 as thus formed is moved as a unit into position in the inflator housing 28 during assembly of the inflator 12.

The first assembly 60 (FIGS. 3 and 4) includes a plug or base 70 that supports the other parts of the initiator. The base 70 is made from an electrically conductive material, preferably stainless steel or aluminum. The base 70 is preferably cast as one piece. The base 70 could, alternatively, be machined and/or made from more than one piece of material.

The base 70 includes a main body portion 72 having a generally cylindrical configuration. The main body portion 72 has an outer side surface 74 centered on an axis 76, and inner and outer end surfaces 78 and 80 that extend perpendicular to the axis. The outer side surface 74 includes a tapered surface portion 82 that extends from the inner end surface 78, and a cylindrical surface portion 84 that extends from the tapered surface portion 82.

The base 70 includes a mounting flange 86 that extends radially outward from the cylindrical portion 84 of the outer side surface 74. The mounting flange 86 is located adjacent the outer end surface 80 of the base 70. The mounting flange 86 has an annular shoulder surface 88 extending radially outward from the side surface 74, and a cylindrical outer side surface 90.

The first assembly 60 includes a first electrode 92. The first electrode 92 is preferably formed as one piece with the main body portion 72 of the base 70. The first electrode 92 has a cylindrical configuration and extends axially from the outer end surface 80 of the base 70. In the illustrated embodiment, the first electrode 92 is spaced apart from the axis 76. The first electrode 92 has an outer end portion 94 spaced apart from the main body portion 72 of the base 70.

The base 70 has a cylindrical opening 96 that extends through the main body portion 72 between the inner and outer end surfaces 78 and 80 of the base. The opening 96 is defined by a cylindrical inner surface 98 of the main body portion 72 that extends parallel to the axis 76. The opening 96 is spaced apart from the axis 76.

The first assembly 60 includes a second electrode 100. The second electrode 100 is made from an electrically conductive material, which could be the same material as the base 70. The second electrode 100 extends parallel to the first electrode 92 and parallel to the axis 76. The second electrode 100 has an inner end portion 102 disposed in the opening 96 in the base 70, and an outer end portion 104 adjacent the end portion 94 of the first electrode 92.

The first assembly 60 further includes an insulator 106. The insulator 106 is preferably formed as a glass seal between the inner end portion 102 of the second electrode 100 and the inner surface 98 of the main body portion 72 of the base 70. The insulator 106 electrically insulates between the inner end portion 102 of the second electrode 100 and the base 70.

The first assembly 60 includes a heating element in the form of an ohmic (resistive) bridgewire 108. The bridgewire 108 may be made from any suitable material. The bridgewire 108 is connected by welding between the inner end portion 102 of the second electrode 100 and the inner end surface 78 of the base 70. The bridgewire 108 thus establishes an electrical connection between the second electrode 100 and the base 70.

The first assembly 60 also includes an ignition droplet 110. The ignition droplet 110 may be made and applied in the manner set forth in U.S. Pat. No. 5,939,660. The droplet 110 is formed of a mixture of a solid pyrotechnic material and a liquid resin binder that is curable, preferably under the influence of ultraviolet (UV) radiation. The ignition droplet 110 has the shape of a somewhat spherical segment with a generally circular outer periphery centered on the axis 76, and with an arcuate radial profile generally symmetrical about the axis.

Figure 4:
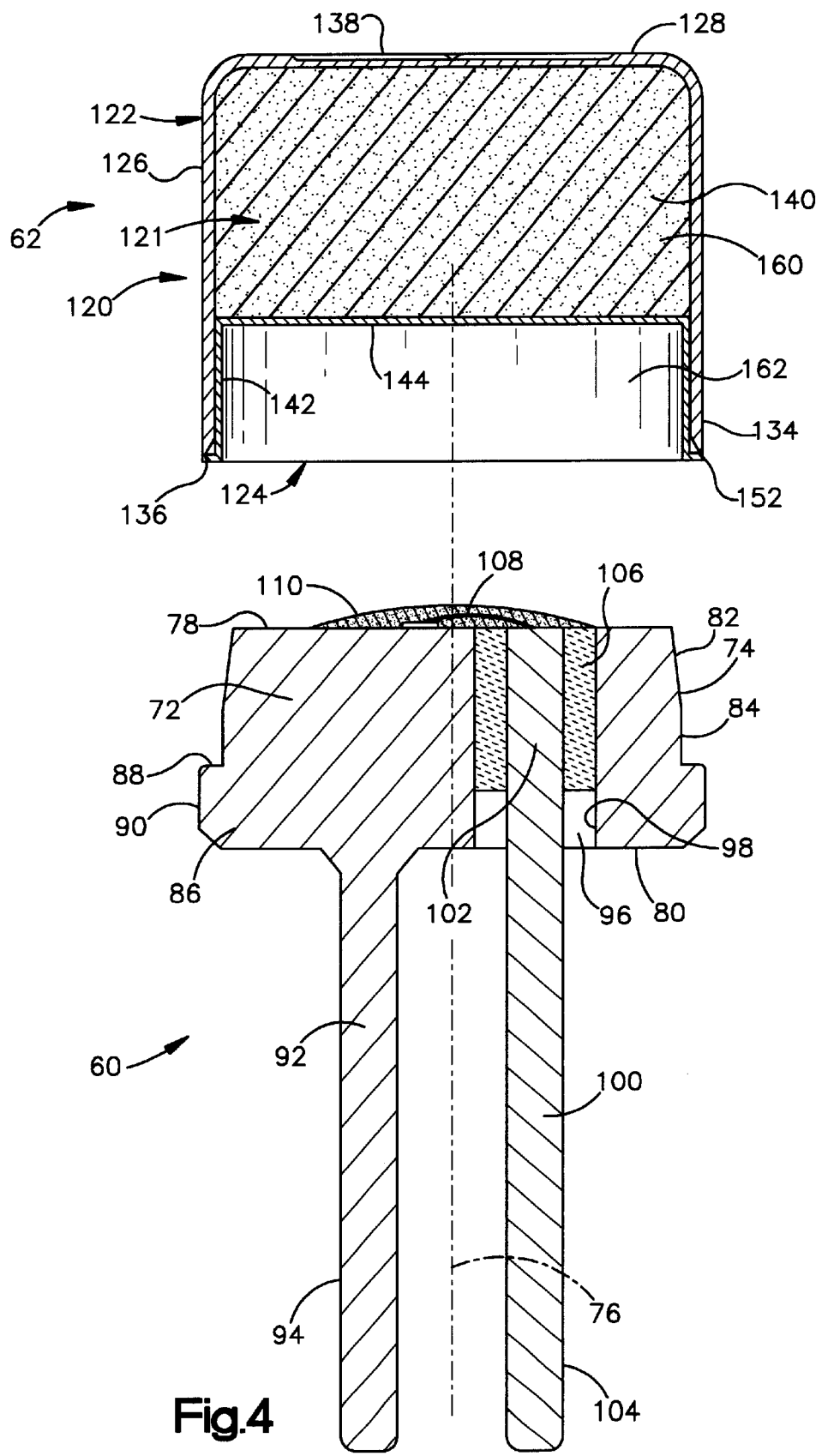
FIG. 4 is an exploded view of the initiator of FIG. 3.

The ignition droplet 110 is installed in this configuration by first depositing it in the position of FIG. 4 in a fluid condition. The droplet 110 is preferably large enough to cover the entire bridgewire 108, and most preferably flows fully around the bridgewire to surround it along its entire length except where welded. Thus, the ignition droplet 110 is in intimate contact with the bridgewire 108. The droplet 110 when cured adheres to the bridgewire 108, the second electrode 102, the glass seal 106, and the base 70, as a solid cohesive body.

The second assembly 62 (FIGS. 3–5) is a hermetically sealed charge container 120 with an output charge 121 in the container. The second assembly 62 is manufactured separately from the first assembly 60 as a self-contained unit. The second assembly 62 is, thereafter, secured to the first assembly 60, as described below, to form the initiator 10.

The charge container 120 includes a charge cup 122 and a closure 124 for the charge cup. The charge cup 122 and the closure 124 are each made from an electrically conductive material. Suitable materials include stainless steel and non-ferrous metals with corrosion resistant coatings. Each one of the charge cup 122 and closure 124 is preferably drawn from a single piece of metal.

The charge cup 122 has a cup-shaped configuration including a cylindrical side wall 126 and a circular, radially extending end wall 128. The side wall 126 has cylindrical, inner and outer side surfaces 130 and 132 that extend parallel to the axis 76. The side wall 126 has an end portion 134 opposite the end wall 128. The side wall end portion 134 has a terminal end surface 136 presented away from the end wall 128.

The end wall 128 of the charge cup 122 has a predetermined weakened portion 138 to facilitate rupturing of the charge cup 122 upon ignition of the charge 121. The charge cup 122 is, nonetheless, rigid and strong enough to survive handling until assembled in the inflator 12. The charge cup 122 partially defines a chamber 140 in the charge container 120. The chamber 140 has an axial extent equal to the length of the charge cup side wall 126.

The closure 124 may be made from the same material as the charge cup 122. The closure 124 and the charge cup 122 together form a Faraday cage, or shielded enclosure. Suitable materials include stainless steel and non-ferrous metals with corrosion resistant coatings.

In the illustrated configuration, the closure 124 has a configuration similar to that of the charge cup 122. Specifically, the closure 124 has a cup-shaped configuration including a cylindrical side wall 142 and a circular, radially extending end wall 144.

The side wall 142 of the closure 124 has cylindrical, inner and outer side surfaces 146 and 148 that extend parallel to the axis 76. The outer diameter of the side wall 142 of the closure 124 is the same as or slightly greater than the inner diameter of the side wall 126 of the charge cup 122. The closure side wall 142 has an end portion 150 opposite the end wall 144. The side wall 142 of the closure 124 is substantially shorter than the side wall 126 of the charge cup 122.

An annular mounting flange 152 of the closure 124 extends radially outward from the end portion 150 of the side wall 142. The mounting flange 152 has an outer diameter that is substantially equal to the outer diameter of the side wall 126 of the charge cup 122.

The end wall 144 of the closure 124 is slightly smaller in diameter than the end wall 128 of the charge cup 122. The end wall 144 of the closure 124 has parallel inner and outer radially-extending surfaces 158 and 156 and is configured to rupture upon the application of force from ignition of the ignition droplet 110, as described below. Thus, the end wall 144 may have one or more predetermined weakened portions. Alternatively, the end wall 144 may be made of a uniform material, such as a burst foil, that is strong enough to withstand normal handling until assembled in the inflator 12 but able to be ruptured by force generated by the ignition droplet 110 upon actuation of the initiator 10.

The output charge 121 comprises a material that, when heated to ignition, produces heat and other combustion products for initiating actuation of the inflation fluid source 20 of the inflator 12. The output charge 121 may be, for example, BKNO$_3$ (boron potassium nitrate). Other suitable pyrotechnic materials includes ZPP, BZPP, ZWPP, or THxPP.

During manufacture of the second assembly 62, the output charge 121 is placed in the charge cup 122. The output charge 121 may be consolidated in the charge cup 122 to ensure that the finished second assembly 62 has minimal or no open space in the charge container 120 when fully assembled.

The closure 124 is applied to the subassembly of the charge cup 122 and output charge 121. The side wall 142 of the closure 124 fits inside the side wall 126 of the charge cup 122 with an interference fit. The end wall 144 of the closure 124 engages the output charge 121 and is spaced apart axially from the end wall 128 of the charge cup 122. Thus, the end wall 144 of the closure 124 is recessed inward from the terminal end surface 136 of the charge cup 122. As a result, the chamber 140 in the charge cup 122 is divided by the closure end wall 144 into a first portion 160 that holds the output charge 121, and a recess or second portion 162 that is empty.

The end portion 150 of the side wall 142 of the closure 124 lies radially inward of the end portion 134 of the side wall 126 of the charge cup 122. The mounting flange 152 of the closure 124 engages the terminal end surface 136 of the side wall 126 of the charge cup 122.

When the closure 124 is assembled with the charge cup 122, the inner portion 160 of the chamber 140 in the charge container 120 is closed. The closure 124 is welded to the charge cup 122 to provide a 360 degree seal for the charge container 120. Specifically, the mounting flange 152 of the closure 124 is welded to the end portion 134 of the side wall 126 of the charge cup 122. The welding provides a hermetic seal for the charge container 120. Alternatively, an electrically conductive adhesive may be used to assemble the closure 124 to the charge cup 122.

The second assembly 62, as thus completed, is preferably cleaned to ensure that its exterior is entirely free of output charge material 121. The second assembly 62 is leak tested to ensure hermeticity. The second assembly 62 is then safe to handle and ship, because there is no exposed pyrotechnic material 121, and because all the pyrotechnic material 121 is enclosed in an electrically shielded enclosure. For example, a large number of the second assemblies 62 can be shipped in bulk to an assembly location at which they are assembled to first assemblies 60 to form completed initiators 10.

By manufacturing the second assembly 62 as a separate sealed item, it can be manufactured at a facility that specializes in the handling of pyrotechnic materials. Thereafter, there is no need to be especially concerned about handling of the charge material 121 at other times during the assembly of the initiator 10. The output charge 121 remains hermetically sealed and electrically shielded in the container 120, until the closure 124 is ruptured in operation of the initiator 10.

Figure 3:
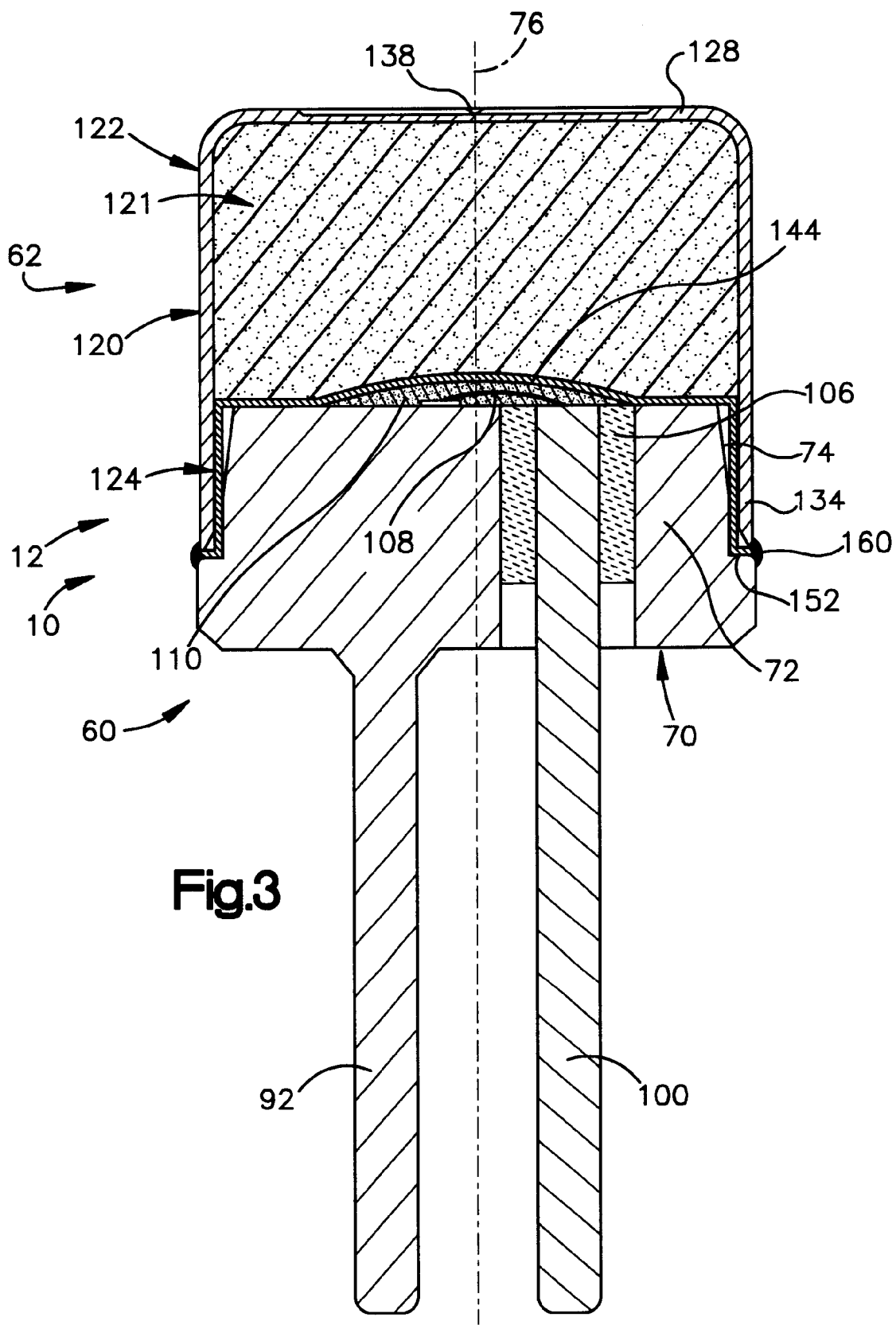
FIG. 3 is a sectional view of the initiator of FIG. 1.

The first assembly 60 is joined to the second assembly 62, to complete the initiator 10, as follows. The first assembly 60 is moved into a position adjacent the second assembly 62, as shown in FIG. 3, in which the mounting flange 152 on the closure 124 is in abutting engagement with the shoulder surface 88 on the base 70. The side wall 142 of the closure 124 overlies the outer side surface 74 of the main body portion 72 of the base 70. The end portion 134 of the side wall 126 of the charge cup 122 thus also overlies, or is disposed radially outward of, the outer side surface 74 of the base 70.

The main body portion 72 of the base 70 is disposed in the recess 162 in the charge container 120, together with the energizable mechanism that includes the ignition droplet 110 and the bridgewire 108. In this position, the outer radially-extending surface 156 of the end wall 144 of the closure 124 of the second assembly 62 abuttingly engages and overlies the ignition droplet 110 of the first assembly 60. The ignition droplet 110 is pressed directly against the end wall 144 of the closure 124. Because the ignition droplet 110 projects from the inner end surface 78 of the base 70, the end wall 144 of the closure 124 deforms as shown in FIG. 3 to accommodate the ignition droplet.

The second assembly 62 is thereafter fixedly secured to the first assembly 60. In the illustrated embodiment, the mounting flange 152 of the closure 124, and the end portion 134 of the side wall 126 of the charge cup 122, are welded to the base 70 as shown at 160. Alternatively, the second assembly 62 may be bonded to the first assembly 60 by an electrically conductive adhesive.

FIG. 6 is a schematic illustration of an assembly process 170 as described above. In the assembly process 170 shown in FIG. 6, a plurality of first assemblies 60 are provided, at a location adjacent to a plurality of second assemblies 62. At a station 172, one of the first assemblies 60 is moved into engagement with one of the second assemblies 62, as described above. The second assembly 62 is bonded to the first assembly 60, by welding or adhesive. Additional manufacturing steps may be undertaken at subsequent stations. For example, a molded plastic insulation jacket 162 (shown only in FIGS. 2 and 6) may be incorporated in the initiator 10 at a station 174 following the securing of the first assembly 60 to the second assembly 62.

The completed initiator 10 is thereafter assembled into the inflator 12. A sleeve 180 is press fit between the initiator 10 and the side wall 52 of the igniter housing 50 to secure the initiator in position in the housing 28. An ignition material 182 is located in the ignition chamber 54, adjacent to and in contact with the initiator 10. The ignition material 182 is a known material that is ignitable by the initiator 10 and, when ignited, generates combustion products. One suitable material is boron potassium nitrate, or $BKNO_3$. A metal igniter cap 184 is placed on the upper end of the igniter housing 50. The igniter cap 184 contains the ignition material 182 in the ignition chamber 54.

The inflator 12 includes a first flow control member in the form of a combustor or combustion cup 190. The combustion cup 190 has an annular configuration including a radially extending lower end wall 192 and an axially extending side wall 194. A ring-shaped propellant chamber or combustion chamber 196 is defined inside the combustion cup. The radially outer boundary of the propellant chamber 196 is the side wall 194 of the combustion cup 190. The radially inner boundary of the propellant chamber 196 is the side wall 52 of the igniter housing 50.

The lower end wall 192 of the combustion cup 190 extends radially inward from the lower portion of the side wall 194 of the combustion cup. The lower end wall 192 is in abutting engagement with the end wall 42 of the closure 40. The axial length of the combustion cup 190 is selected so that the combustion cup is trapped or captured axially between the diffuser 30 and the closure 40.

The combustion cup 190 and the end wall 32 of the diffuser 30 define a fluid passage 198 in the inflator 12. Because the combustion cup side wall 194 is cylindrical, the fluid passage 198 has an annular configuration extending around and centered on the axis 36. The fluid passage 198 is located between the combustion chamber 196 and the fluid outlets 38. The fluid passage 198, which is normally closed, opens upon actuation of the inflator 12 as described below.

The inflation fluid source 20, in the form of a solid propellant, is located in the combustion chamber 196 in the combustion cup 190. The propellant 20 is a known material that is ignitable by the igniter assembly 80 to produce inflation fluid in the form of gas under pressure for inflating the air bag 14. The propellant 20 is illustrated as being provided in the form of discs. (For clarity in FIG. 2, the propellant discs are not shown in some areas of the combustion chamber 116.) The propellant 20 could, alternatively, be provided in the form of small pellets or tablets, or as large discs encircling the igniter housing 50.

The inflator 12 includes a propellant retainer 202 in the combustion chamber 196. The propellant retainer 202 is a ring-shaped metal plate having a plurality of perforations 204. The propellant retainer 202 extends radially between the igniter housing 50 and the combustion cup 190.

The inflator 12 also includes a combustor heat sink 204 in the combustion chamber 196. The heat sink 204 has an annular configuration extending around an upper end portion of the side wall 52 of the igniter housing 50. The heat sink 204 is formed as a knitted stainless steel wire tube that is compressed to the frustoconical shape illustrated in the drawings.

The inflator 12 includes a second fluid flow control member in the form of a threshold cap 206. The threshold cap 206 is disposed in the combustion chamber 196, and is located axially between the igniter cap 184 and the diffuser 30. The threshold cap 206 is made from stamped sheet metal, preferably aluminum, substantially thinner than the housing parts 30 and 40.

The threshold cap 206 has a plurality of openings in the form of slots 208 formed in a side wall of the threshold cap. The slots 208 are spaced apart equally along the side wall, in a circular array centered on the axis 36. The slots 208 in the threshold cap 206 together form a fluid flow control passage 210 in the threshold cap. In the illustrated embodiment, the threshold cap 206 has six slots 208. A greater or lesser number of slots 208 may be provided to obtain the desired flow control characteristics of the inflator 12.

Prior to actuation of the inflator 12, the combustion cup side wall 194 seals against the diffuser end wall 32, so that the fluid passage 198 is closed and has zero flow area. The closed fluid passage 198 blocks fluid flow between the combustion chamber 196 and the fluid outlets 38, prior to actuation of the inflator 12.

If a collision-indicating condition is sensed by the crash sensor 22 for which inflation of the air bag 16 is desired to help protect the occupant of the vehicle, the controller transmits an actuation signal or current to the inflator 12. Specifically, an electric current is caused to flow between the first and second electrodes 92 and 100 of the initiator, through the bridgewire 108. The bridgewire 108 generates heat. The heat is transferred to the ignition droplet 110, which is in intimate contact with the bridgewire 108, and the ignition droplet is ignited.

The combustion products of the ignition droplet 110 rupture the end wall 144 of the closure 124 and impinge upon the output charge 121 in the charge container 120. The abutting engagement of the ignition droplet 110 with the end wall 144 of the closure 124 facilitates rupturing of the end wall 144.

The output charge 121 is ignited by the combustion products of the ignition droplet 110. The output charge 121 itself produces combustion products including heat, hot gases, and a shock wave. These combustion products rupture the end wall 128 of the charge cup 122 and flow into the ignition chamber 54, igniting the ignition enhancer 182.

The ignition enhancer 182 produces combustion products that rupture the foil 58 and flow through the passages 56 into the combustion chamber 196. The combustion products flowing into the combustion chamber 196 ignite the propellant 20. The propellant 20 combusts and produces inflation fluid under pressure in the combustion chamber 196.

The end wall 32 of the diffuser 30 deforms axially outward, in an upward direction as viewed in FIG. 2. Simultaneously, the end wall 42 of the closure 40 deforms axially outward in the opposite direction. As the diffuser 30 and closure 40 move away from each other, the fluid pressure in the combustion chamber 196 causes the threshold cap 206 to move with the diffuser, away from the closure. The heat sink 204 and the propellant retainer 202 also move with the diffuser 30, away from the closure 40. This movement of the threshold cap 206 opens the control passage 210, to enable fluid to flow out of the combustion chamber 196 through the fluid passage 198.

At the same time, the combustion cup 190 moves away from the end wall 32 of the diffuser 30. The fluid passage 198 opens and its flow area increases, because of the deformation of the inflator housing 20.

The heat sink 204 cools and filters the inflation fluid flowing out of the combustion chamber 196. The inflation fluid flows out of the combustion chamber 196, through the slots 208 in the threshold cap 206, and toward the fluid passage 198. Inflation fluid flows through the fluid passage 198, through a final filter 220, and toward the inflation fluid outlets 38. The fluid outlets 38 direct the inflation fluid to flow out of the housing 20 to the inflatable device 16.

From the above description of the invention, those skilled in the art will perceive improvements, changes and modifications in the invention. For example, the bridgewire may be replaced by a heating element formed as part of a semiconductor (chip). Such improvements, changes and modifications within the skill of the art are intended to be covered by the appended claims.

Having described the invention, I claim:

1. Apparatus comprising:
   a first assembly and a second assembly fixedly mounted to each other;
   said first assembly comprising a base and an electrically energizable mechanism on said base, said first assembly having a first mounting portion, said first assembly comprising an assembled unit prior to being fixedly mounted to said second assembly;
   said second assembly comprising a sealed container and an ignitable material sealed in said sealed container, said pre-sealed container being defined by a two-part structure sealed together, said two-part structure having a first wall portion that is rupturable to enable ignition of said ignitable material and a second wall portion that is rupturable in response to ignition of said ignitable material to enable flow of combustion products of said ignitable material out of said sealed container, said sealed container having a second mounting portion, said second assembly comprising an assembled unit prior to being fixedly mounted to said first assembly; and
   said first mounting portion of said first assembly being in abutting engagement with said second mounting portion of said second assembly thereby to fix said first assembly for movement with said second assembly, said first wall portion of said sealed container rupturing and said ignitable material in said sealed container igniting in response to energizing of said energizable mechanism.

2. Apparatus as set forth in claim 1 wherein said energizable mechanism comprises a second ignitable material and a heating mechanism electrically actuatable by a flow of electric current to generate heat to ignite said second ignitable material, said rupturable first wall of said container being in abutting engagement with said second ignitable material of said energizable mechanism.

3. Apparatus as set forth in claim 1 wherein said mounting portion of said first assembly comprises a cylindrical wall portion of said base, said mounting portion of said second assembly comprises a cylindrical wall portion of said container, and said mounting portion of said second assembly extends around and is secured to said base.

4. Apparatus as set forth in claim 1 wherein said container has first and second opposite end walls and has a side wall having a terminal end surface, said first end wall of said container including said first rupturable wall portion and said second end wall of said container including said second rupturable wall portion, said first end wall of said container being recessed inward from said terminal end surface of said side wall of said container to form a recess in said container, at least a portion of said first assembly being received in said recess.

5. Apparatus as set forth in claim 1 further comprising an inflator housing and an inflation fluid source in said inflator housing, said inflation fluid source being actuatable in response to flow of combustion products of said ignitable material out of said container, said first assembly and said second assembly when fixed together forming an initiator that is movable as one piece relative to said inflator housing and said inflation fluid source during assembly of said inflator.

6. Apparatus as set forth in claim 5 further comprising an ignition enhancer that is located adjacent said container in said inflator housing, said ignition enhancer being ignitable by said combustion products of said ignitable material in said container to generate additional combustion products that effect actuation of said inflation fluid source.

7. Apparatus as set forth in claim 1 wherein said second assembly has a cup-shaped configuration including a first chamber portion containing said ignitable material and a second chamber portion forming a recess in said container, said energizable mechanism being located in said recess.

8. Apparatus as set forth in claim 7 wherein said first rupturable wall portion of said container separates said first chamber portion from said second chamber portion and is in abutting engagement with said energizable mechanism.

9. Apparatus comprising:
   a first assembly and a second assembly fixedly mounted to each other;
   said first assembly comprising a base and an electrically energizable mechanism on said base, said first assembly comprising an assembled unit prior to being fixedly mounted to said second assembly;
   said second assembly comprising a two-component sealed container defining a hermetically sealed chamber and an ignitable material sealed in said chamber, said second assembly comprising an assembled unit prior to being fixedly mounted to said first assembly;
   said sealed container being fixedly mounted on said base; and
   said electrically energizable mechanism, when energized, rupturing said sealed container and igniting said ignitable material.

10. Apparatus as set forth in claim 9 wherein said container has a first rupturable wall portion that at least partially defines said hermetically sealed chamber, said container having a recess on a side of said rupturable wall portion opposite said hermetically sealed chamber, a portion of said base and said electrically energizable mechanism being received in said recess.

11. Apparatus as set forth in claim 9 wherein said hermetically sealed container comprises a first part having a cup-shaped configuration including a cylindrical side wall and a second part having a cup-shaped configuration including a cylindrical side wall, said second part being received in said first part so that said side wall of said second part is radially inward of said side wall of said first part.

12. Apparatus as set forth in claim 11 wherein said first part has a circular first end wall and said second part has a circular second end wall that is spaced apart from said first end wall, said chamber with said ignitable material being located between said first end wall and said second end wall.

13. Apparatus as set forth in claim 12 wherein said container has a mounting portion that extends past said second end wall of said second part to define a recess for receiving said electrically energizable mechanism of said first assembly.

14. Apparatus as set forth in claim 11 wherein said cylindrical side walls of said first and second parts have overlying end portions that are bonded by welding or adhesive to said base.

15. Apparatus comprising:
   a first assembly comprising a base and an electrically energizable mechanism on said base;
   a second assembly separate from said first assembly and comprising a container having a hermetically sealed chamber and an ignitable material in said chamber;
   said hermetically sealed container being fixedly mounted on said base; and
   said electrically energizable mechanism, when energized, rupturing said container and igniting said ignitable material,
   said container having a first rupturable wall portion that at least partially defines said hermetically sealed chamber, said container having a recess on a side of said rupturable wall portion opposite said hermetically sealed chamber, a portion of said base and said electrically energizable mechanism being received in said recess,
   said first rupturable wall portion of said container being deformed due to contact with said energizable mechanism when said hermetically sealed container is fixedly mounted on said base.

16. Apparatus comprising:
   a first assembly comprising a base and an electrically energizable mechanism on said base, said first assembly having a first mounting portion;
   a second assembly comprising a sealed container and an ignitable material in said container, said container having a first wall portion that is rupturable to enable ignition of said ignitable material, said container having a second wall portion that is rupturable in response to ignition of said ignitable material to enable flow of combustion products of said ignitable material out of said container, said container having a second mounting portion; and
   said first mounting portion of said first assembly being in abutting engagement with said second mounting portion of said second assembly thereby to fix said first assembly for movement with said second assembly, said first wall portion of said container rupturing and said ignitable material in said container igniting in response to energizing of said energizable mechanism,
   said energizable mechanism comprising a second ignitable material and a heating mechanism electrically actuatable by a flow of electric current to generate heat to ignite said second ignitable material, said rupturable first wall of said container being in abutting engagement with said second ignitable material of said energizable mechanism,
   said energizable mechanism being received in a recess in said sealed container, said first wall portion of said container being deformed due to contact with said energizable mechanism when said first mounting portion of said first assembly is moved into abutting engagement with said second mounting portion of said second assembly to fix said first assembly for movement with said second assembly.

17. The apparatus of claim 1 wherein said two-part structure of said sealed container consists of a charge cup and a cup shaped closure sealed together,
   said charge cup including a first cylindrical side wall connected to said second rupturable wall, said first cylindrical side wall having a terminal end,
   said closure including a second cylindrical side wall connected to said first rupturable wall,
   said second cylindrical side wall of said closure having a diameter slightly smaller than a diameter of said first cylindrical side wall of said charge cup,
   said second cylindrical side wall of said closure fitting inside the diameter of said first cylindrical side wall of said charge cup with an interference fit.

18. The apparatus of claim 17 wherein an annular mounting flange extends radially outward from said second cylindrical side wall,
   said mounting flange of said closure abuts said terminal end of said charge cup when in said interference fit, and
   said container being sealed at said abutting mounting flange of said closure and said terminal end of said charge cup.

19. The apparatus of claim 18 wherein said sealed container is sealed by one of an adhesive and a weld.

* * * * *